(12) United States Patent
Onose

(10) Patent No.: US 11,756,340 B2
(45) Date of Patent: Sep. 12, 2023

(54) DISPLAY DEVICE

(71) Applicant: FANUC CORPORATION, Yamanashi (JP)

(72) Inventor: Nao Onose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 442 days.

(21) Appl. No.: 16/902,527

(22) Filed: Jun. 16, 2020

(65) Prior Publication Data
US 2021/0012583 A1 Jan. 14, 2021

(30) Foreign Application Priority Data

Jul. 8, 2019 (JP) ................................. 2019-126956

(51) Int. Cl.
| | | |
|---|---|---|
| *G07C 3/00* | (2006.01) | |
| *G02B 27/01* | (2006.01) | |
| *G06F 8/65* | (2018.01) | |
| *G08B 5/36* | (2006.01) | |
| *H02J 50/80* | (2016.01) | |

(52) U.S. Cl.
CPC ........... *G07C 3/00* (2013.01); *G02B 27/0172* (2013.01); *G02B 27/0176* (2013.01); *G06F 8/65* (2013.01); *G08B 5/36* (2013.01); *H02J 50/80* (2016.02); *G02B 2027/0138* (2013.01); *G02B 2027/0141* (2013.01)

(58) Field of Classification Search
CPC .................................. G06F 1/26; H02J 50/80
See application file for complete search history.

(56) References Cited

U.S. PATENT DOCUMENTS

| | | | |
|---|---|---|---|
| 10,509,466 B1* | 12/2019 | Miller | G06F 3/011 |
| 10,637,302 B2* | 4/2020 | Hoque | H02J 50/80 |
| 2008/0249712 A1* | 10/2008 | Wang | G01C 21/365 |
| | | | 701/414 |
| 2015/0177833 A1* | 6/2015 | Vennstrom | G06T 7/73 |
| | | | 345/156 |

(Continued)

FOREIGN PATENT DOCUMENTS

| JP | 5625896 | 11/2014 |
|---|---|---|
| JP | 5625896 B2 * | 11/2014 |

*Primary Examiner* — Phil K Nguyen
(74) *Attorney, Agent, or Firm* — Wenderoth, Lind & Ponack, L.L.P.

(57) ABSTRACT

To acquire maintenance information easily from packed electronic equipment without unpacking. An AR display device includes: an information projection unit that performs display on the basis of augmented reality; a wireless power supply unit that performs wireless power supply to packed electronic equipment; a wireless power supply control unit that controls directivity and distance of the wireless power supply unit upon performing wireless power supply to the packed electronic equipment, so that a packing box of the packed electronic equipment is displayed on the information projection unit; a wireless communication unit that performs wireless communication with the packed electronic equipment to which the wireless power supply is performed; and a control unit that displays maintenance information received from the packed electronic equipment on the information projection unit.

5 Claims, 6 Drawing Sheets

(56) References Cited

U.S. PATENT DOCUMENTS

| | | | |
|---|---|---|---|
| 2016/0163108 A1* | 6/2016 | Kim | G02B 27/0179 |
| | | | 345/633 |
| 2016/0225198 A1* | 8/2016 | Punjabi | G07C 5/008 |
| 2017/0018973 A1* | 1/2017 | Murayama | H02J 50/10 |
| 2018/0210726 A1* | 7/2018 | Jun | G06F 8/71 |
| 2021/0184508 A1* | 6/2021 | Lee | H02J 50/402 |
| 2022/0222064 A1* | 7/2022 | Park | H02J 50/40 |
| 2022/0239355 A1* | 7/2022 | Katz | H04W 4/80 |

\* cited by examiner

DISPLAY DEVICE

This application is based on and claims the benefit of priority from Japanese Patent Application No. 2019-126956, filed on 8 Jul. 2019, the content of which is incorporated herein by reference.

BACKGROUND OF THE INVENTION

Field of the Invention

The present invention relates to a display device.

Related Art

For packed electronic equipment, there is the task of checking the type and version of hardware, or the version of software (hereinafter, also referred to as "firmware"). In this case, in order to find the electronic equipment to be checked, an operator opens the boxes one by one in a wide factory or warehouse and turns on the electronic equipment to check the versions of the hardware or firmware. Alternatively, the operator visually searches for the boxes each having a control number printed thereon indicating the version of the hardware or firmware.

In this regard, a technology has been known which sends power to a predetermined packing box, turns on the electronic equipment in each packing box by the power being sent to the wireless power supply device of each packing box, and wirelessly transmits a program for rewriting to each piece of the electronic equipment to thereby rewrite the program. For example, see Patent Document 1.

Patent Document 1: Japanese Patent No. 5625896

SUMMARY OF THE INVENTION

However, the wireless power supply devices are provided in the respective packing boxes, there is a problem that the cost increases.

Furthermore, in order to reliably supply power through wireless power supply to the electronic equipment in a desired packing box, at is necessary to oscillate radio waves having a predetermined directivity at a predetermined distance; however, in a case in which there are a large number of pieces of electronic equipment in the respective packing boxes therearound, it may be difficult to keep the appropriate distance therebetween, or determine what directivity is to be given to them.

Therefore, it is desirable to acquire maintenance information easily from packed electronic equipment without unpacking.

A display device according to an aspect of the present disclosure includes: an information projection unit that performs display on the basis of augmented reality; a wireless power supply unit that performs wireless power supply to packed electronic equipment; a wireless power supply control unit that controls directivity and distance of the wireless power supply unit upon performing wireless power supply to the packed electronic equipment, so that a packing box of the packed electronic equipment is displayed on the information projection unit; a wireless communication unit that performs wireless communication with the packed electronic equipment to which the wireless power supply is performed; and a control unit that displays maintenance information received from the packed electronic equipment on the information projection unit.

According to one aspect, it is possible to acquire maintenance information easily from packed electronic equipment without unpacking.

DETAILED DESCRIPTION OF THE INVENTION

Embodiment

First, an outline of the present embodiment will be described. In the present embodiment, a display device controls the directivity and distance such that a packing box of packed electronic equipment is displayed on an information projection unit, and wirelessly supplies power to the packed electronic equipment. The display device acquires maintenance information from the packed electronic equipment, and projects the acquired maintenance information to the information projection unit.

With such a configuration, according to the present embodiment, it is possible to solve the above-described problem of "to acquire maintenance information easily from packed electronic equipment without unpacking".

The outline of the present embodiment is described above.

Next, a detailed description will be given of the configuration of the present embodiment with reference to the drawings.

Figure 1:
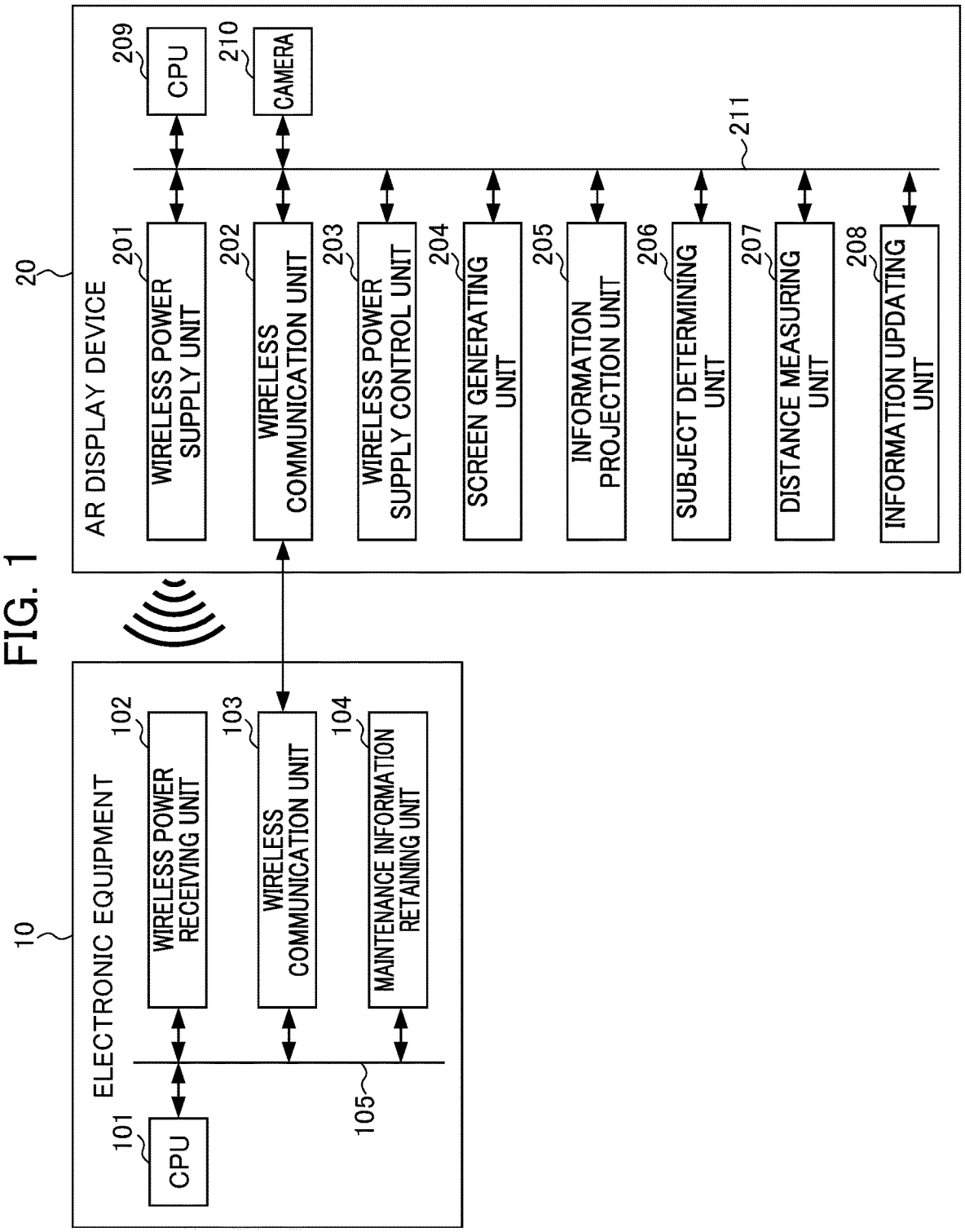
FIG. 1 is a diagram showing an example of a configuration of an AR display system according to an embodiment.

FIG. 1 is a diagram showing an example of a configuration of an AR (Augmented Reality) display system according to the present embodiment. As shown in FIG. 1, the AR display system includes packed electronic equipment 10 and an AR display device 20. The packed electronic equipment 10 and the AR display device 20 are connected to each other wirelessly.

It should be noted that, unless otherwise noted, the packed electronic equipment 10 is simply referred to as the "electronic equipment 10".

Electronic Equipment 10

The electronic equipment 10 includes, for example, CNC (Computerized Numerical Control) devices, robotic controllers, machine tools, robots, and the like. It should be noted that the electronic equipment 10 of the present embodiment is not limited thereto, and may be other electronic equipment.

As shown in FIG. 1, the electronic equipment 10 includes a CPU 101, a wireless power receiving unit 102, a wireless communication unit 103, and a maintenance information retaining unit 104, and a bus 105. Furthermore, the CPU 101, the wireless power receiving unit 102, the wireless communication unit 103, and the maintenance information retaining unit 104 are communicably connected via the bus 105.

The CPU (Central Processing Unit) 101, for example, executes various kinds of processing according to various programs such as firmware stored in the maintenance information retaining unit 104 to be described later.

The wireless power receiving unit 102 wirelessly receives the power supplied by the AR display device 20 to be described later. The wireless power receiving unit 102 supplies the received power to at least the wireless communication unit 103 and the maintenance information retaining unit 104. Thereafter, when the wireless communication is completed in the handshake with the AR display device 20 in the wireless communication by the wireless communication unit 103, the wireless power receiving unit 102 may disconnect the power supply to the wireless communication unit 103 and the maintenance information retaining unit 104.

The wireless communication unit 103 controls wireless communication with the AR display device 20.

The maintenance information retaining unit 104 is ROM (Read Only Memory), an HDD (Hard Disk Drive) or the like, and stores various programs such as firmware, as well as data such as the model number of the electronic equipment 10 and the versions of various programs.

More specially, in a case in which the electronic equipment 10 is CNC, the maintenance information retaining unit 104 stores, as the hardware maintenance information, the type of the board inserted in the slot, the type of the display machine, the type of MDI (Manual Data Input) key, and the like. The maintenance information retaining unit 104 stores software versions such as CNC, a PLC (Programmable Logic Controller), BOOT, graphics, a spindle, and a network, as maintenance information of the software.

AR Display Device 20

Figure 2:
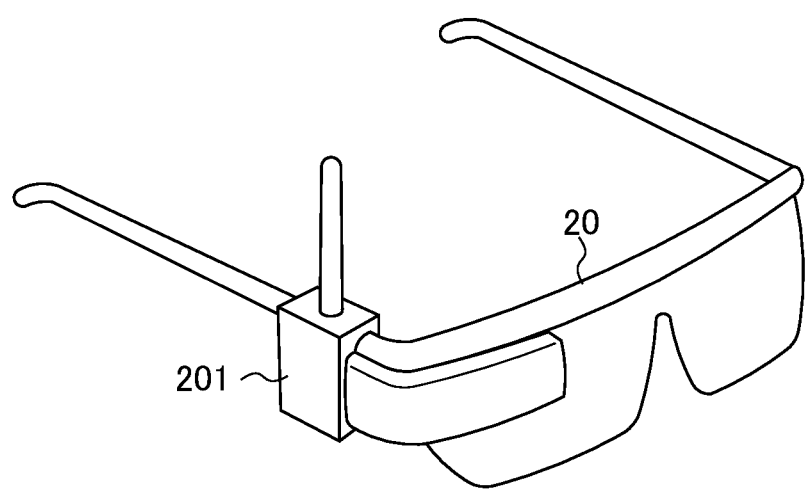
FIG. 2 is a diagram showing an example of a case of an AR glass as an AR display device.

The AR display device 20, for example, as shown in FIG. 2, is an AR glass or the like, and includes a wireless power supply unit 201 to be described later.

As shown in FIG. 1, the AR display device 20 includes the wireless power supply unit 201, a wireless communication unit 202, a wireless power supply control unit 203, a screen generating unit 204, an information projection unit 205, a subject determining unit 206, a distance measuring unit 207, an information updating unit 208, a CPU 209, a camera 210, and a bus 211. Furthermore, the wireless power supply unit 201, the wireless communication unit 202, the wireless power supply control unit 203, the screen generating unit 204, the information projection unit 205, the subject determining unit 206, the distance measuring unit 207, the information updating unit 208, the CPU 209, and the camera 210 are communicably connected via the bus 211.

The wireless power supply unit 201 supplies power to the electronic equipment 10 by wireless power supply. It should be noted that, in the wireless power supply by the wireless power supply unit 201, the frequency is a frequency band of several GHz such as 2.4 GHz band. In addition, the power of power transmission is from several mW to several 100 W. In addition, the distance of power transmission ranges from several meters to several kilometers or more.

The wireless communication unit 202 controls wireless communication with the electronic equipment 10.

The wireless power supply control unit 203 controls the directivity and distance when the wireless power supply unit 201 performs the wireless power supply to the electronic equipment 10 in a manner, such that the packing box of the electronic equipment 10 is displayed through the information projection unit 205 to be described later.

Figure 3A:
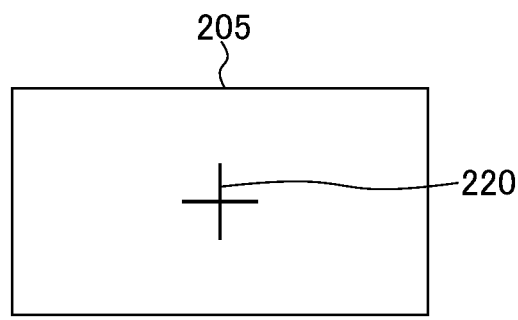
FIG. 3A is a diagram showing an example of a reticle projected on an information projection unit of FIG. 1.
Figure 3B:
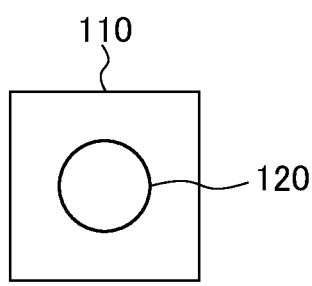
FIG. 3B is a diagram showing an example of a mark provided on a packing box of packed electronic equipment.
Figure 3C:
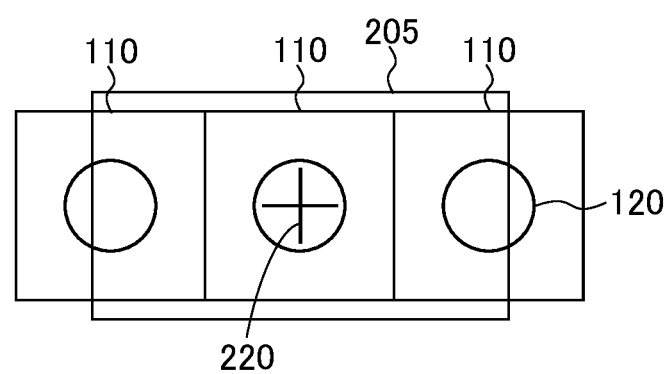
FIG. 3C is a diagram showing an example in which the reticle of the information projection unit is superimposed on the mark on the packing box of the electronic equipment.

More specifically, as shown in FIG. 3A, the wireless power supply control unit 203 projects the reticle 220 to the information projection unit 205 to be described later. As shown in FIG. 3B, a mark 120 such as a circle may be provided in advance on the side surface of the packing box 110 of the packed electronic equipment 10. The wireless power supply control unit 203, for example, projects a message such as "Please direct towards the packing box of the electronic equipment for which the maintenance information is desired to be acquired" to the information projection unit 205 to thereby instruct the user of the AR display device 20. As shown in FIG. 3C, the user adjusts the orientation of the AR display device 20 so that the mark 120 of the packing box 110 of the electronic equipment 10 for which the maintenance information is desired to be acquired among the plurality of packing boxes 110 is superimposed on the reticle 220 of the information projection unit 205.

That is, since the user of the AR display device 20 views the packing box 110 of the electronic equipment 10 for which the maintenance information is desired to be acquired, the directivity of the wireless power supply unit 201 is secured in a direction in which the AR display device 20 faces.

Furthermore, the wireless power supply control unit 203 compares the distance of the packing box 110 of the electronic equipment 10 for which the maintenance information is desired to be acquired, which was measured by the distance measuring unit 207 to be described later, with the optimal power supply distance stored in the storage unit (not shown) included in the AR display device 20. In a case in which the distance measured by the distance measuring unit 207 is closer than the optimal power supply distance, the wireless power supply control unit 203 projects a message (warning) such as "Please slightly increase distance" on the information projection unit 205 to cause the user of the AR display device 20 to move away from the packing box 110. Alternatively, in a case in which the distance measured by the distance measuring unit 207 is farther than the optimal power supply distance, the wireless power supply control unit 203 projects a message (warning) such as "Please bring a little closer" on the information projection unit 205 to cause the user of the AR display device 20 to move closer to the packing box 110.

Thereafter, the wireless power supply control unit 203 sets the packing box 110 in which the reticle 220 is superimposed on the mark 120 as a target for power supply, and controls the directivity and the distance of the wireless power supply unit 201 on the basis of the orientation of the packing box 110 as the target for power supply and the optimal power supply distance to the packing box 110. The wireless power supply control unit 203 starts the wireless power supply by the wireless power supply unit 201 to the packing box 110 as the target for power supply.

The screen generating unit 204 generates the screen of the reticle 220 for expanding display by the information projection unit 205 and the data of the screen of the maintenance information acquired from the electronic equipment 10, and outputs the generated screen data to the information projection unit 205.

The information projection unit 205 uses the data of the screen generated by the screen generating unit 204 to project, for example, the reticle 220 and the maintenance information acquired from the electronic equipment 10 via the wireless communication unit 202.

Figure 4:
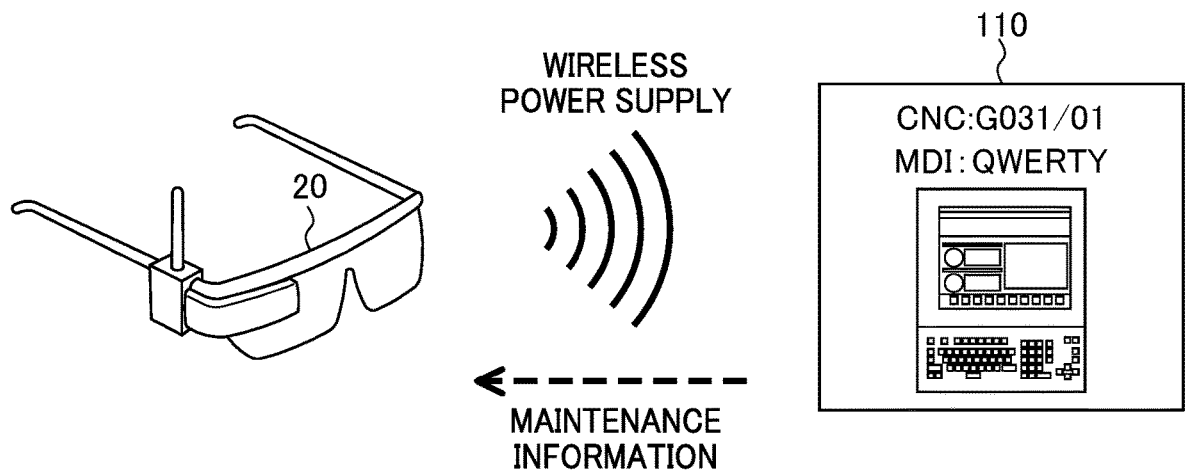
FIG. 4 is a diagram showing an example of display of the maintenance information of the packed electronic equipment.

FIG. 4 is a diagram showing an example of display of the maintenance information of the packed electronic equipment 10.

As shown in FIG. 4, the information projection unit 205 projects the operation panel of the CNC together with the model number "G031/01" of the CNC and the type "QWERTY" of the MDI-key on the packing box 110 of the packed electronic equipment 10.

The subject determining unit 206, for example, determines the packing box 110 which is the subject from an image captured by the camera 210 to be described later using a technique of known subject recognition.

The distance measuring unit 207, for example, measures the distance from the image captured by the camera 210 to the packing box 110 which is the subject determined by the subject determining unit 206 to be described later, using a technique of triangulation using a known AR camera.

In a case in which there is firmware of a version that is newer than the version of the firmware included in the maintenance information acquired from the electronic equipment 10, the information updating unit 208 transmits the latest firmware stored in a storage unit (not shown) of the AR display device 20 to the electronic equipment 10 via the wireless communication unit 202, and updates it.

The CPU 209, for example, executes, as a control unit, various kinds of processing in accordance with various programs stored in the storage unit of the AR display device 20 (not shown). For example, the CPU 209 causes the information projection unit 205 to project the maintenance information received from the electronic equipment 10, as shown in FIG. 4.

The camera 210, for example, is a digital camera that captures a subject of the packing box 110 of the electronic equipment 10 for which the maintenance information is desired to be acquired, and outputs the captured image to the subject determining unit 206 and the distance measuring unit 207.

Display Processing of AR Display Device 20

Next, a description will be given of the operation relating to display processing of the AR display device 20 according to the present embodiment.

Figure 5:
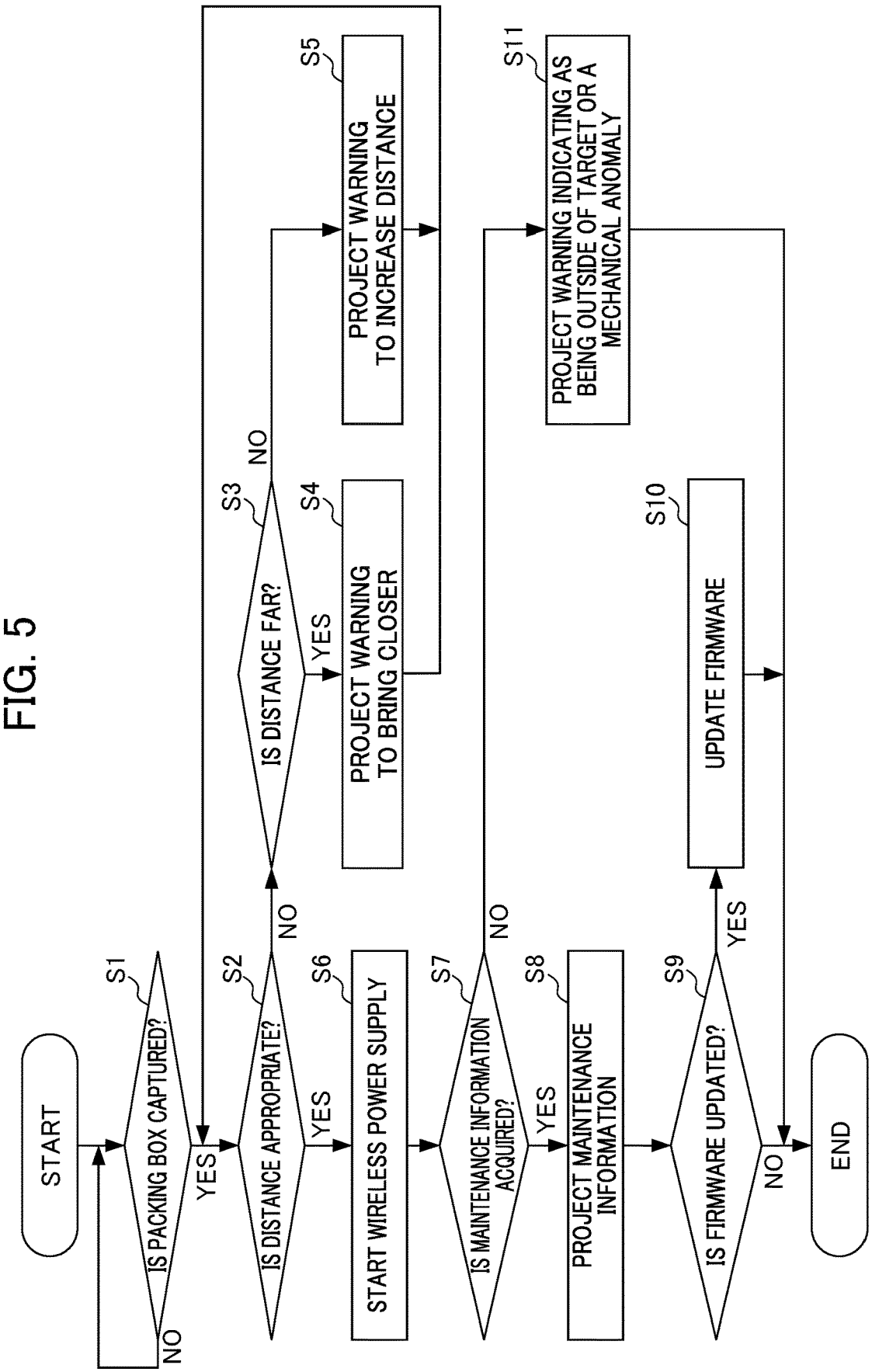
FIG. 5 is a flowchart for explaining display processing of the AR display device.

FIG. 5 is a flowchart for explaining the display processing of the AR display device 20.

In Step S1, the subject determining unit 206 determines whether or not the packing box 110 of the electronic equipment 10 for which the maintenance information is desired to be acquired by the camera 210 has been captured as a subject. In a case in which the packing box 110 of the electronic equipment 10 for which the maintenance information is desired to be acquired was captured, the processing advances to Step S2. On the other hand, in a case in which the packing box 110 of the electronic equipment 10 for which the maintenance information is desired to be acquired has not been captured, the processing waits at Step S1 until the packing box 110 of the electronic equipment 10 for which the maintenance information is desired to be acquired is captured by the camera 210.

In Step S2, the distance measuring unit 207 determines whether the distance to the packing box 110 captured in Step S1 is appropriate. If the distance is appropriate, the processing advances to Step S6. If the distance is not appropriate, the processing advances to Step S3.

In Step S3, the distance measuring unit 207 determines whether the distance to the packing box 110 measured in Step S2 is farther than the appropriate power supply distance. If the distance is farther, the processing advances to Step S4. On the other hand, if the distance is closer, the processing advances to Step S5.

In Step S4, the wireless power supply control unit 203 projects a warning such as "Please bring a little closer" onto the information projection unit 205 to cause the user of the AR display device 20 to move closer to the packing box 110. Thereafter, the processing returns to Step S2.

In Step S5, the wireless power supply control unit 203 projects a warning such as "Please slightly increase distance" onto the information projection unit 205 to cause the user of the AR display device 20 to move away from the packing box 110. Thereafter, the processing returns to Step S2.

In Step S6, the wireless power supply control unit 203 starts the wireless power supply by the wireless power supply unit 201 to the packing box 110 of the electronic equipment 10 for which the maintenance information is desired to be acquired.

In Step S7, the CPU 209 determines, via the wireless communication unit 202, whether or not the maintenance information has been acquired from the electronic equipment 10 within a predetermined time (e.g., 10 seconds, etc.). If the maintenance information has been acquired from the electronic equipment 10, the processing advances to Step S8. On the other hand, if the maintenance information has not been acquired from the electronic equipment 10, the processing advances to Step S10.

In Step S8, the CPU 209 projects the maintenance information acquired in Step S7 onto the information projection unit 205, as shown in FIG. 4.

In Step S9, the information updating unit 208 determines whether or not to update the firmware of the electronic equipment 10 on the basis of the version of the firmware included in the maintenance information acquired in Step S7. If a version of firmware which is newer than the version of the firmware of the maintenance information exists, the processing advances to Step S10. On the other hand, if the version of the firmware version of the maintenance information is the latest version, the processing ends.

In Step S10, the information updating unit 208 transmits the latest firmware stored in the storage unit (not shown) of the AR display device 20 to the electronic equipment 10 through the wireless communication unit 202 and updates it. Thereafter, the processing ends.

In Step S11, if the maintenance information has not been acquired in Step S7, the CPU 209 projects a warning indicating that it is outside of the target or there is a mechanical abnormality onto the information projection unit 205. Thereafter, the processing ends.

As described above, the AR display device 20 of an embodiment controls the directivity and the distance of the wireless power supply unit 201 upon performing the wireless power supply to the packed electronic equipment 10, so that the packing box 100 of the packed electronic equipment 10 is displayed through the information projection unit 205. With such a configuration, it is possible for the AR display device 20 to easily acquire various kinds of maintenance information of the packed electronic equipment 10 without unpacking the packing box 110, and thus, it is possible to check the acquired maintenance information by the projection by the information projection unit 205.

Furthermore, taking advantage of the augmented reality features of the AR display device 20, it is possible to perform the wireless power supply with higher precision to the electronic equipment 10 by controlling the directivity and distance of the wireless power supply unit 201.

Although one embodiment has been described above, the AR display device 20 is not limited to the above-described embodiment, and includes modifications, improvements, and the like of an extent that the object can be achieved.

Modification Example 1

Figure 6:
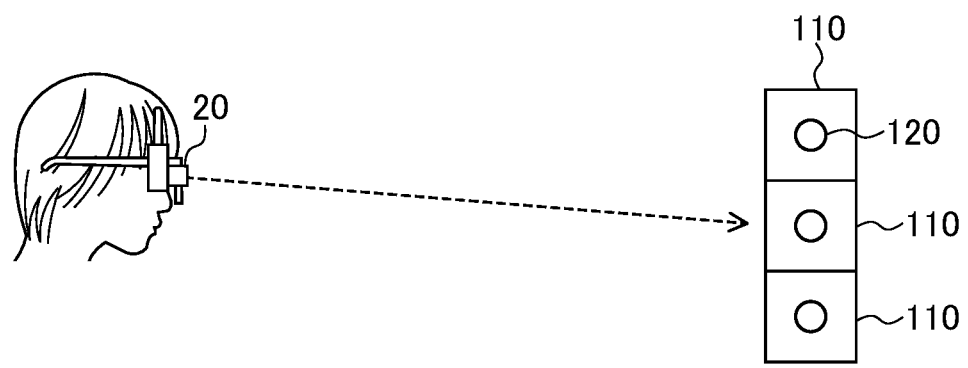
FIG. 6 is a diagram showing an example for explaining the detection of the line of sight of a user of the AR display device.

In the above-described embodiment, the wireless power supply control unit 203 is configured such that the orientation of the AR display device 20 is adjusted by the user of the AR display device 20, so that the mark 120 of the packing box 110 of the electronic equipment 10 for which the maintenance information is desired to be acquired among the plurality of packing boxes 110 is superimposed on the reticle 220 of the information projection unit 205. However, the present invention is not limited thereto. The AR display device 20 may include, for example, an ocular potential sensor (not shown). As shown in FIG. 6, the ocular potential sensor (not shown) may detect a line of sight that passes through a lens portion (the information projection unit 205) of the user wearing the AR display device 20 (AR glass) indicated by a broken line by the ocular potential sensing, i.e. a line of sight that faces a direction in front of the AR glass. The wireless power supply control unit 203 may control the directivity of the wireless power supply unit 201 on the basis of the detected line of sight of the user.

It should be noted that FIG. 6 shows a case in which the user of the AR display device 20 is looking at the middle packing box 110 among the three packing boxes 110.

It should be noted that each function included in the AR display device 20 according to an embodiment can be respectively realized by hardware, software, or a combination thereof. Herein, being realized by software indicates being realized by a computer reading and executing programs.

Each component included in the AR display device 20 may be implemented by hardware including electronic circuitry or the like, software, or a combination thereof. If implemented by software, a program comprising the software is installed on the computer (the AR display 20). These programs may also be recorded on removable media and distributed to the user or downloaded to the user's computer over a network. Furthermore, when configured by hardware, a part or all of the functions of each component included in the above-described device can be constituted by an integrated circuit (IC) such as, for example, an ASIC (Application Specific Integrated Circuit), a gate array, an FPGA (Field Programmable Gate Array), a CPLD (Complex Programmable Logic Device), or the like.

The programs can be stored in any of various types of non-transitory computer readable media and be provided to a computer. The non-transitory computer readable media include various types of tangible storage media. Examples of non-transitory computer readable media include magnetic recording media (e.g., flexible disks, magnetic tapes, hard disk drives), magneto-optical media (e.g., magneto-optical disks), CD-ROM (Read Only Memory), CD-R, CD-R/W, and semiconductor memory (e.g., mask ROM, PROM (Programmable ROM), EPROM (Erasable PROM), flash ROM, and RAM). In addition, the programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical cable, an optical fiber, or the like or a wireless communication path.

It should be noted that, in the present specification, the steps defining the program recorded in the storage medium include not only the processing executed in a time series following this order, but also processing executed in parallel or individually, which is not necessarily executed in a time series.

In other words, the display device of the present disclosure can assume various embodiments having the following configurations.

(1) A display device (the AR display device 20) according to the present disclosure includes: an information projection unit 205 that performs display on the basis of augmented reality; a wireless power supply unit 201 that performs wireless power supply to packed electronic equipment 10; wireless power supply control unit 203 that controls directivity and distance of the wireless power supply unit 201 upon performing wireless power supply to the packed electronic equipment 10, so that a packing box 110 of the packed electronic equipment 10 is displayed on the information projection unit 205; a wireless communication unit 202 that performs wireless communication with the packed electronic equipment 10 to which the wireless power supply is performed; and a control unit (the CPU 209) that displays maintenance information received from the packed electronic equipment 10 on the information projection unit 205.

According to the display device, it is possible to easily acquire the maintenance information of the packed electronic equipment 10 without unpacking.

(2) The wireless power supply control unit 203 may cause the wireless power supply unit 201 to perform the wireless power supply to the packed electronic equipment 10 on which a reticle 220 projected to the information projection unit 205 is superimposed.

With such a configuration, by utilizing the augmented reality features, it is possible to wirelessly supply power with higher accuracy to the packed electronic equipment 10 by controlling the directivity of the wireless power supply unit 201.

(3) The display device may further include an ocular-potential sensor that detects a line of sight that passes through the information projection unit 205 of a user of the display device, in which the wireless power supply control unit may cause the wireless power supply unit 201 to perform the wireless power supply to the packed electronic equipment 10 located on the line of sight of the user thus detected.

With such a configuration, by utilizing the augmented reality features, it is possible to wirelessly supply power with higher accuracy to the packed electronic equipment 10 by controlling the directivity of the wireless power supply unit 201.

(4) The display device may further include: a camera 210 that captures a packing box 110 of the packed electronic equipment 10; and a distance measuring unit 207 that measures a distance from an image captured by the camera 210 to the packing box 110, in which the wireless power supply control unit 203 may display an instruction to the user of the display device on the information projection unit 205, so that the distance measured by the distance measuring unit 207 becomes a power supply distance of the wireless power supply unit 201.

With such a configuration, by utilizing the augmented reality features, it is possible to wirelessly supply power with higher accuracy to the packed electronic equipment 10 by controlling the distance of the wireless power supply unit 201.

(5) The packed electronic equipment 10 may include: a wireless power receiving unit 102 that receives power supplied wirelessly by the wireless power supply unit 201; a maintenance information retaining unit 104 that retains the maintenance information of the packed electronic equipment 10; and a wireless communication unit 103 that performs wireless communication with the display device, in which the wireless power receiving unit 102 may supply received power to at least the maintenance information retaining unit 104 and the wireless communication unit 103 of the packed electronic equipment 10.

With such a configuration, it is possible to acquire the maintenance information from the packed electronic equipment 10 with little power.

(6) The display device may further include an information updating unit 208 that updates the maintenance information of the packed electronic equipment 10.

With such a configuration, it is possible to update the firmware of the packed electronic equipment 10 to the latest firmware.

EXPLANATION OF REFERENCE NUMERALS 10 packed electronic equipment
102 wireless power receiving unit
103 wireless communication unit
104 maintenance information retaining unit
20 AR display unit
201 wireless power supply unit
202 wireless communication unit
203 wireless power supply control unit
205 information projection unit

What is claimed is:

1. A display device comprising:
an information projection unit that performs display on the basis of augmented reality;
a wireless power supply unit that performs wireless power supply to packed electronic equipment;
a wireless power supply control unit that controls directivity and distance of the wireless power supply unit upon performing wireless power supply to the packed electronic equipment, so that a packing box of the packed electronic equipment is displayed on the information projection unit;
a wireless communication unit that performs wireless communication with the packed electronic equipment to which the wireless power supply is performed; and
a control unit that displays maintenance information received from the packed electronic equipment on the information projection unit in a manner projecting onto the packing box of the packed electronic equipment on the basis of augmented reality,
wherein the wireless power supply control unit adjusts an orientation of the display device so that a reticle projected to the information projection unit is superimposed on a mark provided on the packing box of the packed electronic equipment, and causes the wireless power supply unit to perform the wireless power supply.

2. The display device according to claim 1, further comprising an ocular-potential sensor that detects a line of sight that passes through the information projection unit of a user of the display device,
wherein the wireless power supply control unit causes the wireless power supply unit to perform the wireless power supply to the packed electronic equipment located on the line of sight of the user thus detected.

3. The display device according to claim 1, further comprising:
a camera that captures a packing box of the packed electronic equipment; and
a distance measuring unit that measures a distance from an image captured by the camera to the packing box,
wherein the wireless power supply control unit displays an instruction to the user of the display device on the information projection unit, so that the distance measured by the distance measuring unit becomes a power supply distance of the wireless power supply unit.

4. The display device according to claim 1,
wherein the packed electronic equipment includes:
a wireless power receiving unit that receives power supplied wirelessly by the wireless power supply unit;
a maintenance information retaining unit that retains the maintenance information of the packed electronic equipment; and
a wireless communication unit that performs wireless communication with the display device,
wherein the wireless power receiving unit supplies received power to at least the maintenance information retaining unit and the wireless communication unit of the packed electronic equipment.

5. The display device according to claim 1, further comprising an information updating unit that updates the maintenance information of the packed electronic equipment.

* * * * *